US009975395B2

(12) United States Patent
Dettling et al.

(10) Patent No.: US 9,975,395 B2
(45) Date of Patent: May 22, 2018

(54) MOTOR VEHICLE AIR CONDITIONING UNIT

(71) Applicant: MAHLE INTERNATIONAL GmbH, Stuttgart (DE)

(72) Inventors: Elke Dettling, Asperg (DE); Thomas Frey, Boebingen (DE); Thomas Feith, Korntal-Muenchingen (DE); Gottfried Duerr, Ludwigsburg (DE); Joachim Raimann, Korntal-Muenchingen (DE)

(73) Assignee: MAHLE International GmbH, Stuttgart (DE)

( * ) Notice: Subject to any disclaimer, the term of this patent is extended or adjusted under 35 U.S.C. 154(b) by 761 days.

(21) Appl. No.: 14/169,748

(22) Filed: Jan. 31, 2014

(65) Prior Publication Data
US 2014/0144605 A1 May 29, 2014

Related U.S. Application Data

(63) Continuation of application No. PCT/EP2012/065321, filed on Aug. 6, 2012.

(30) Foreign Application Priority Data

Aug. 5, 2011 (DE) .................. 10 2011 080 491

(51) Int. Cl.
*B60H 1/00* (2006.01)
*F28F 9/00* (2006.01)
*B23P 15/26* (2006.01)

(52) U.S. Cl.
CPC .......... *B60H 1/00321* (2013.01); *B23P 15/26* (2013.01); *B60H 1/00521* (2013.01);
(Continued)

(58) Field of Classification Search
CPC . B23P 15/26; B60H 1/00321; B60H 1/00521; B60H 2001/00635; F28F 9/001; F28F 9/005
(Continued)

(56) References Cited

U.S. PATENT DOCUMENTS 2,526,135 A * 10/1950 Holmes ................. F28D 9/0031
165/153
2,814,469 A * 11/1957 Pontus ..................... F28F 3/10
165/167
(Continued)

FOREIGN PATENT DOCUMENTS

DE 197 53 562 A1 6/1998
DE 299 13 414 U1 4/2000
(Continued)

*Primary Examiner* — Ljiljana Ciric
(74) *Attorney, Agent, or Firm* — Muncy, Geissler, Olds & Lowe, P.C.

(57) ABSTRACT

A motor vehicle air conditioning unit having a housing, a heat exchanger, at least two manifolds and cooling tubes arranged therebetween forming a tube block. The housing has at least one first sealing rib oriented substantially parallel to an extending direction of the at least two manifolds and at least one second sealing rib oriented substantially parallel to an extending direction of the cooling tubes in the tube block, such that the at least one first sealing rib is oriented perpendicular to the at least one second sealing rib.

9 Claims, 9 Drawing Sheets

(52) U.S. Cl.
CPC .............. *F28F 9/001* (2013.01); *F28F 9/005* (2013.01); *B60H 2001/00635* (2013.01); *Y10T 29/49359* (2015.01)

(58) Field of Classification Search
USPC .......................................................... 165/41
See application file for complete search history.

(56) References Cited

U.S. PATENT DOCUMENTS

| | | | | |
|---|---|---|---|---|
| 3,384,160 A * | 5/1968 | Beurtheret | ............... | F28D 7/16 165/104.13 |
| 3,583,478 A * | 6/1971 | Fieni | ............... | F16L 39/00 165/151 |
| 4,310,960 A * | 1/1982 | Parker | ............... | B23P 15/26 165/166 |
| 4,465,124 A | 8/1984 | Jacquet et al. | | |
| 4,819,720 A * | 4/1989 | Howard | ............... | B64D 13/00 165/104.34 |
| 4,823,867 A * | 4/1989 | Pollard | ............... | F28D 9/0037 165/166 |
| 5,125,454 A * | 6/1992 | Creamer | ............... | F28F 9/001 165/149 |
| 5,226,235 A * | 7/1993 | Lesage | ............... | F28F 1/32 165/149 |
| 5,595,239 A * | 1/1997 | Wolf | ............... | B60H 1/00378 165/41 |
| 5,632,328 A * | 5/1997 | Sawyer | ............... | B60H 1/00321 165/67 |
| 5,848,639 A * | 12/1998 | Flesburg | ............... | F28D 1/0535 165/174 |
| 5,894,649 A * | 4/1999 | Lambert | ............... | B23P 15/26 165/173 |
| 6,460,610 B2 * | 10/2002 | Lambert | ............... | B23P 15/26 165/173 |
| 6,669,548 B2 * | 12/2003 | Fujiwara | ............... | B60H 1/00685 165/41 |
| 6,852,231 B2 * | 2/2005 | Ivansons | ............... | A61M 1/16 210/321.68 |
| 7,234,511 B1 * | 6/2007 | Lesage | ............... | B21D 53/085 165/149 |
| 7,640,966 B2 * | 1/2010 | Maeda | ............... | F28D 1/0435 165/41 |
| 7,794,314 B2 * | 9/2010 | Sekiya | ............... | B60H 1/00692 165/41 |
| 8,794,299 B2 * | 8/2014 | Barfknecht | ............... | F28D 7/1692 123/568.12 |
| 9,328,966 B2 * | 5/2016 | Brauning | ............... | F28D 1/05366 |
| 9,470,461 B2 * | 10/2016 | Merklein | ............... | F28F 9/0226 |
| 2002/0023734 A1 * | 2/2002 | Wagner | ............... | F28D 1/05366 165/81 |
| 2004/0069441 A1 * | 4/2004 | Burgers | ............... | F28D 1/0333 165/41 |
| 2004/0069483 A1 * | 4/2004 | Natsume | ............... | B60H 1/00064 165/204 |
| 2007/0050980 A1 * | 3/2007 | Vetter | ............... | B23K 11/14 29/890.043 |
| 2007/0181773 A1 * | 8/2007 | Tokunaga | ............... | B60H 1/00528 248/640 |
| 2007/0193562 A1 * | 8/2007 | Betcher | ............... | F02M 31/13 123/543 |
| 2009/0173481 A1 * | 7/2009 | Mitsui | ............... | B01J 19/0093 165/166 |
| 2010/0147243 A1 * | 6/2010 | Stec | ............... | F02M 35/161 123/184.21 |
| 2011/0168366 A1 * | 7/2011 | Garret | ............... | F28D 9/0043 165/148 |
| 2012/0043051 A1 * | 2/2012 | Kurokawa | ............... | B60K 11/08 165/41 |
| 2012/0210986 A1 * | 8/2012 | Ghiani | ............... | F02B 29/0462 123/542 |
| 2012/0285423 A1 * | 11/2012 | Nguyen | ............... | F02B 29/0475 123/542 |
| 2013/0105128 A1 * | 5/2013 | Vanderwees | ............... | F28D 9/005 165/165 |
| 2014/0130764 A1 * | 5/2014 | Saumweber | ............... | F02B 29/045 123/184.21 |
| 2014/0311142 A1 * | 10/2014 | Speidel | ............... | F02B 33/44 60/599 |
| 2014/0311143 A1 * | 10/2014 | Speidel | ............... | F02B 37/00 60/599 |
| 2016/0209055 A1 * | 7/2016 | Gedcke | ............... | F24F 1/02 |
| 2016/0263967 A1 * | 9/2016 | Schaake | ............... | B60H 1/3421 |

FOREIGN PATENT DOCUMENTS

| | | | | |
|---|---|---|---|---|
| DE | 102011080491 A1 * | 2/2013 | ......... | B60H 1/00521 |
| EP | 2 058 156 A1 | 5/2009 | | |
| JP | 2004-9813 A | 1/2004 | | |
| JP | 2004-136712 A | 5/2004 | | |
| JP | 2004-230948 A * | 8/2004 | | |
| JP | 2004230948 A * | 8/2004 | | |
| JP | 2007-1329 A * | 1/2007 | | |
| JP | 2007-245857 A * | 9/2007 | | |

* cited by examiner

MOTOR VEHICLE AIR CONDITIONING UNIT

This nonprovisional application is a continuation of International Application No. PCT/EP2012/065321, which was filed on Aug. 6, 2012, and which claims priority to German Patent Application No. DE 10 2011 080 491.9, which was filed in Germany on Aug. 5, 2011, and which are both herein incorporated by reference.

BACKGROUND OF THE INVENTION

Field of the Invention

The present invention relates to a motor vehicle air conditioning unit and a method for manufacturing a motor vehicle air conditioning unit.

Description of the Background Art

Motor vehicle air conditioning units are used to supply cooled and/or heated air to the interior of a motor vehicle. For this purpose, the motor vehicle air conditioning unit includes a refrigerant evaporator for cooling the air and a heater for heating the air. Both the refrigerant evaporator and the heater are disposed and fastened within a housing of the motor vehicle air conditioning unit, which is made of plastic, and the air to be cooled and/or the air to be heated flows therein.

The refrigerant evaporator typically includes at least two manifolds, between which flat tubes are disposed as cooling tubes. The ends of the cooling tubes end in the manifolds, allowing refrigerant to flow through them. Cooling ribs are disposed between the cooling tubes. The extension of the manifolds is greater than the extension of a tube block formed by the cooling tubes and the corrugated ribs. When introducing the refrigerant evaporator into a holding slot in the housing, the extension of the holding slot must therefore at least match the extension of the two manifolds so that the refrigerant evaporator may be inserted into the holding slot. To prevent bypass air from flowing around the refrigerant evaporator outside the two manifolds after the refrigerant evaporator has been introduced into the housing, a side piece made of plastic for additional sealing must therefore be disposed in each of the side areas of the refrigerant evaporator outside the two manifolds on the cooling tubes. These side parts made of plastic for sealing purposes must therefore be produced in a complex manner from thermoplastic plastic by means of injection molding and then fastened to the refrigerant evaporator before being introduced into the housing. As a result, high costs disadvantageously arise during the manufacture of the motor vehicle air conditioning unit.

SUMMARY OF THE INVENTION

It is therefore an object of the present invention to provide a motor vehicle air conditioning unit and a method for manufacturing a motor vehicle air conditioning unit, in which the refrigerant evaporator is sealed with respect to bypass air inexpensively and with little technical effort.

This object is achieved in an embodiment by a motor vehicle air conditioning unit comprising a housing, a heat exchanger, in particular a refrigerant evaporator, which has at least two manifolds and cooling tubes disposed side by side between the at least two manifolds, the cooling tubes disposed side by side forming a tube block, the extension of the at least two manifolds perpendicular and/or parallel to an imaginary plane spanned by the tube block being greater on the outside than the extension of the tube block, the housing having at least one H sealing rib (i.e., first sealing rib) oriented essentially parallel to an imaginary plane spanned by the tube block for sealing a front side and/or a rear side of the tube block, and/or the housing having at least one V sealing rib (i.e., second sealing rib) oriented essentially parallel to an imaginary plane spanned by the cooling tube block for sealing a front side and/or a rear side of the tube block, and the at least one H sealing rib being preferably oriented essentially perpendicular to the at least one V sealing rib. With the aid of the at least one H sealing rib, which is preferably oriented horizontally, and the at least one V sealing rib, which is preferably oriented vertically, the tube block may essentially be sealed with respect to bypass air on a front side, in particular an inflow side, for conducting the air into the refrigerant evaporator. Essentially means, in particular, having a deviation of less than 30°, 20°, 10° or 5°.

The heat exchanger can be, for example, a heater, e.g., a heater having an electrical resistance heater, or a heat exchanger through which cooling fluid for an internal combustion engine flows.

In an embodiment, the at least one H sealing rib rests on the tube block, in particular on the front side of the tube block, and/or the at least one V sealing rib rests on the tube block, in particular on the front side of the tube block.

In an embodiment, the at least one V sealing rib is oriented in a preferably vertical section essentially perpendicular to an axis of the at least two manifolds and perpendicular to an imaginary plane spanned by the tube block at an acute angle to the imaginary plane. The acute angle is in the range of, for example, 10° to 50°, in particular 10° to 30°. The section is thus oriented essentially perpendicular to an axis of the at least two manifolds and perpendicular to an imaginary plane spanned by the tube block.

The at least one H sealing rib can be oriented in a horizontal section essentially parallel to an axis of the at least two manifolds and perpendicular to an imaginary plane spanned by the tube block, essentially perpendicular to the imaginary plane. Oriented essentially perpendicular to the imaginary plane means that the at least one H sealing rib is oriented, for example, in a horizontal section perpendicular to an imaginary plane spanned by the tube block, with a deviation of less than 30°, 20°, 10° or 5° perpendicular to the imaginary plane. The section is thus oriented essentially parallel to an axis of the at least two manifolds and perpendicular to an imaginary plane spanned by the tube block.

In an embodiment, the at least one H sealing rib and/or the at least one V sealing rib and/or at least one housing manifold section, in particular a ramp or wedge geometry, can form a single piece with the housing or a housing part, and/or the housing manifold section, in particular the ramp or wedge geometry, has at least one predetermined breaking point, and/or the at least one H sealing rib is oriented essentially parallel to an axis of the at least two manifolds and/or essentially horizontally, and/or the at least one V sealing rib is oriented essentially perpendicular to an axis of the at least two manifolds and/or is oriented essentially vertically, and/or the housing has a two-part design, in particular a housing upper part and a housing lower part, and/or the housing has a geometry on at last one housing manifold section which essentially matches the outer geometry of the at least two manifolds, and the at least one housing manifold section rests on the at least two manifolds and, in particular, the at least one housing manifold section is partially designed as a ramp or wedge geometry for moving the heat exchanger, in particular the refrigerant evaporator, in the direction of the at least one H sealing rib and/or in the direction of the at least one V sealing rib when the heat exchanger, in particular the refrigerant evaporator, is inserted into the housing, in particular into a housing part. In a one-part design of the at least one H sealing rib and/or the at least one V sealing rib, forming a single piece with the housing or a housing part, the costs during manufacturing may be substantially reduced because the at least one H or V rib may be also produced during manufacturing of the housing by means of injection molding from a thermoplastic plastic, so that essentially no costs are incurred thereby and, in addition, no separate parts, e.g., side parts, need to be fastened to the heat exchanger, in particular the refrigerant evaporator, during manufacturing.

In an embodiment, the motor vehicle air conditioning unit includes a heater for heating the air conducted through the motor vehicle air conditioning unit, and/or the motor vehicle air conditioning unit includes a blower and/or an air filter, and/or the motor vehicle air conditioning unit includes an air duct which is preferably delimited by the housing, and/or the motor vehicle air conditioning unit includes at least one air conducting device, in particular a damper, and/or corrugated ribs are disposed between the cooling tubes.

A method according to the present invention for manufacturing a motor vehicle air conditioning unit, in particular a motor vehicle air conditioning unit described in this patent application, comprises the following steps: Providing a first housing part and a second housing part; providing a heat exchanger, in particular a refrigerant evaporator, which includes at least two manifolds and cooling tubes disposed side by side between the at least two manifolds, the cooling tubes disposed side by side forming a tube block, the extension of the at least two manifolds perpendicular and/or parallel to an imaginary plane spanned by the tube block being greater on the outside than the extension of the tube block; inserting the heat exchanger, in particular the refrigerant evaporator, into the first housing part; inserting the refrigerant evaporator into the second housing part, at least one manifold being pushed past at least one H rib into the first housing part and/or the second housing part when the heat exchanger, in particular the refrigerant evaporator, is inserted, and the heat exchanger, in particular the refrigerant evaporator, subsequently being moved in the direction of the at least one H sealing rib, preferably until the at least one H sealing rib rests on the tube block, and/or at least one manifold being pushed past at least one H rib and/or at least one V rib into the first housing part and/or the second housing part when the heat exchanger, in particular the refrigerant evaporator, is inserted, and the heat exchanger, in particular the refrigerant evaporator, being subsequently moved in the direction of the at least one V sealing rib, preferably until the at least one sealing rib rests on the tube block.

The first housing part is preferably a housing lower part, and the heat exchanger, in particular the refrigerant evaporator, is inserted downward into the housing lower part, and/or the second housing part is a housing upper part, and the heat exchanger, in particular the refrigerant evaporator, is inserted into the housing upper part by moving the housing upper part to the housing lower part.

In an embodiment, the heat exchanger, in particular the refrigerant evaporator, can be moved in the direction of the at least one H sealing rib and/or in the direction of the at least one V sealing rib, in that a movement of the heat exchanger, in particular the refrigerant evaporator, is essentially deflected in the direction of an imaginary plane spanned by the tube block on the basis of a ramp geometry on the housing upper part and/or on the housing lower part.

In an embodiment, the heat exchanger, in particular the refrigerant evaporator, is placed in a housing manifold section and held in a form-locked manner by the housing manifold section after being inserted into the first housing part, and/or the heat exchanger, in particular the refrigerant evaporator, is placed on a housing manifold section and held in a form-locked manner by the housing manifold section after being inserted into the second housing part.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
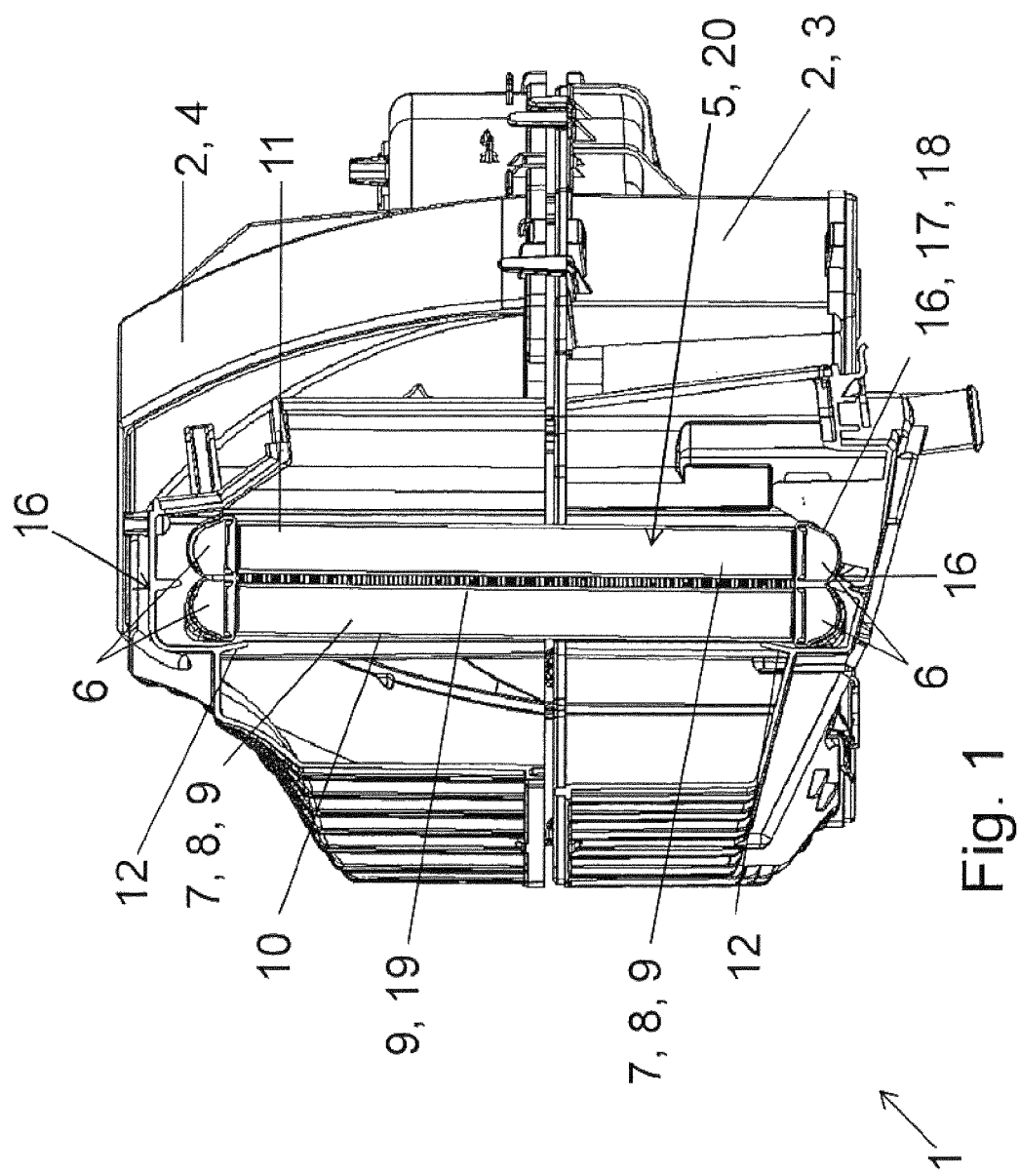
FIG. 1 shows a vertical section of a housing, including a refrigerant evaporator.

A motor vehicle air conditioning unit 1 illustrated in FIG. 1 is used to supply cooled and/or heated air to the interior of a motor vehicle. For this purpose, motor vehicle air conditioning unit 1 has a housing 2 which, among other things, delimits air ducts 23 (also see FIG. 8). Air is sucked in from the surroundings or from the interior of the motor vehicle by a blower 21 (see FIG. 8), and subsequently cooled on a refrigerant evaporator 5 in the form of heat exchanger 20 as well as heated on a heater 24 (see FIG. 8).

Housing 2 comprises a housing lower part 3 and a housing upper part 4 made of thermoplastic plastic. Refrigerant evaporator 5 is made at least partially, in particular completely, of metal, in particular aluminum, and it is manufactured by brazing in a brazing furnace. Two horizontally oriented manifolds 6 are provided on the upper side of refrigerant evaporator 5, and two horizontally oriented manifolds 6 are also provided on a lower side of refrigerant evaporator 5. Cooling tubes 7 designed as flat tubes 8, which are sealed fluid-tight in openings in manifolds 6, are present between the two manifolds 6 so that refrigerant from manifolds 6 may flow in and out of cooling tubes 7. Cooling tubes 7 are oriented vertically, and corrugated ribs 19 are disposed between cooling tubes 7. The air to be cooled by refrigerant evaporator 5 flows into refrigerant evaporator 5 on a front side 10 as the inflow side and flows out of refrigerant evaporator 5 on a rear side 11 as the outflow side. Cooling tubes 7 as well as corrugated ribs 19 form a tube block 9 which spans an imaginary plane 14. Perpendicular and parallel to imaginary plane 14, manifolds 6 have a greater extension on the outside than does tube block 9. For example, the extension is in the range of 1 mm to 2 mm greater on each side so that manifolds 6 form a projection with respect to tube block 9.

Figure 6:
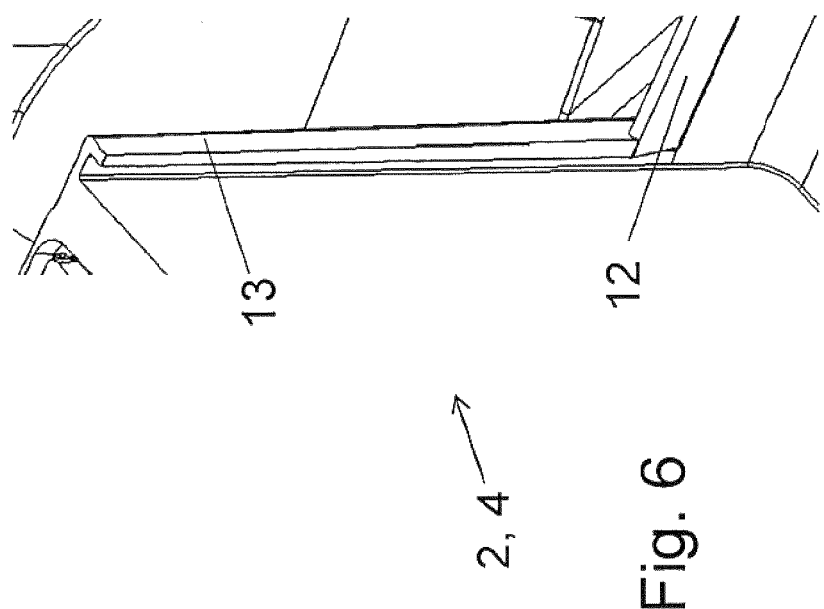
FIG. 6 shows a partial view of the housing upper part in the upside-down position, including the H sealing rib and a V sealing rib.
Figure 7:
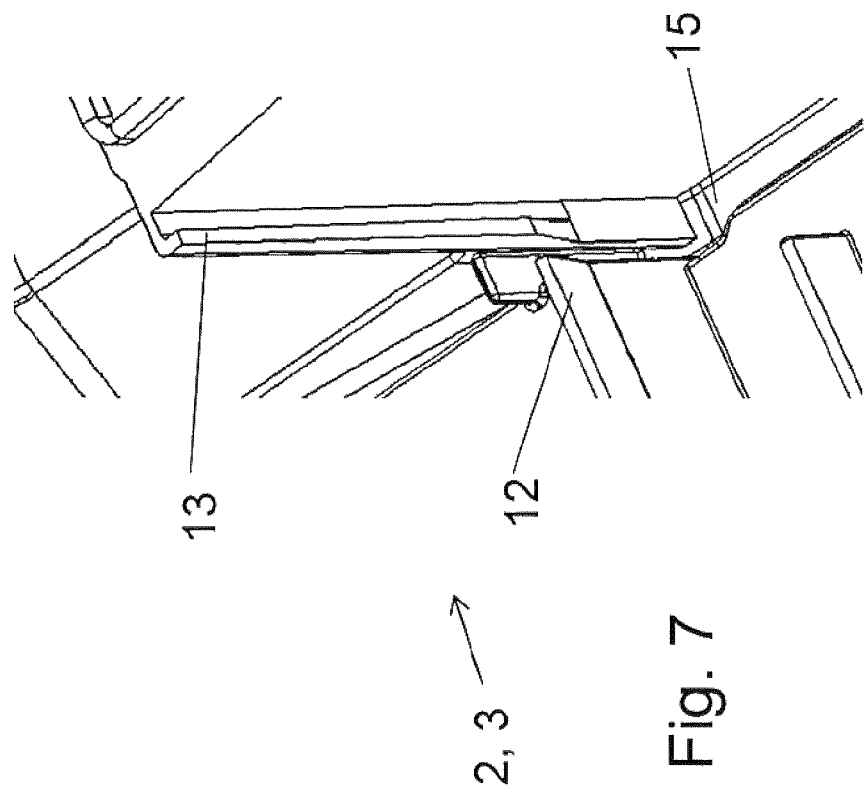
FIG. 7 shows a partial view of the housing upper part, including the H sealing rib and a V sealing rib.
Figure 9:
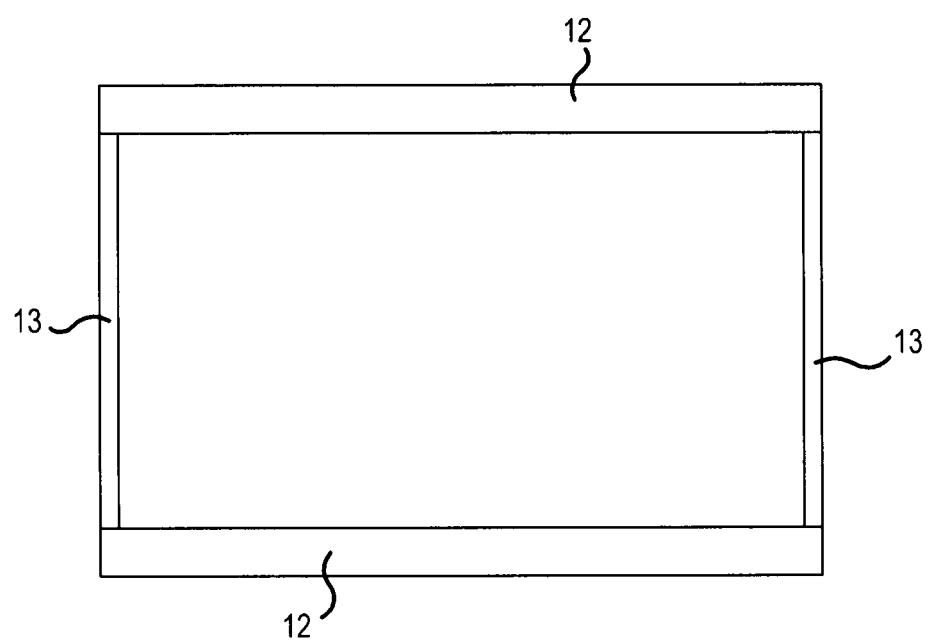
FIG. 9 is a schematic, front view of the circumferential sealing frame formed by the sealing ribs.

A horizontally oriented H sealing rib 12 (i.e., first sealing rib) is provided on housing lower part 3 as well as on housing upper part 4. In the section according to the illustrations in FIGS. 2 through 5, H sealing rib 12 is oriented at an acute angle to imaginary plane 14. Furthermore, two V sealing ribs 13 (i.e., second sealing ribs) are present on housing lower part 3 and on housing upper part 4 (FIGS. 6 and 7). V sealing ribs 13 are disposed in the lateral end area of tube block 9 so that H sealing ribs 12 and V sealing ribs 13 form an essentially rectangular, completely circumferential sealing frame which rests on front side 10 of tube block 9. FIG. 9 depicts the circumferential sealing frame formed by the H sealing ribs 12 and the V sealing ribs 13.

Figure 2:
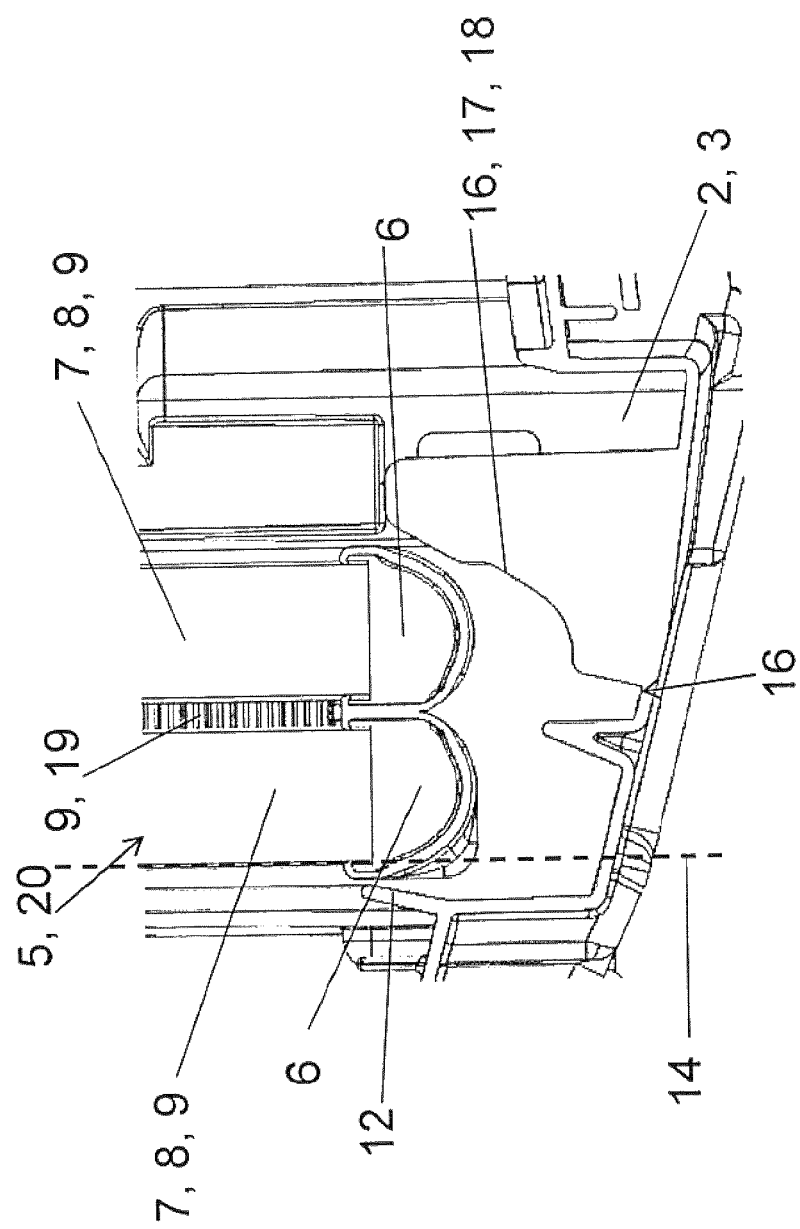
FIG. 2 shows a vertical section of a housing lower part, including the refrigerant evaporator, as two manifolds are being pushed past an H sealing rib.
Figure 3:
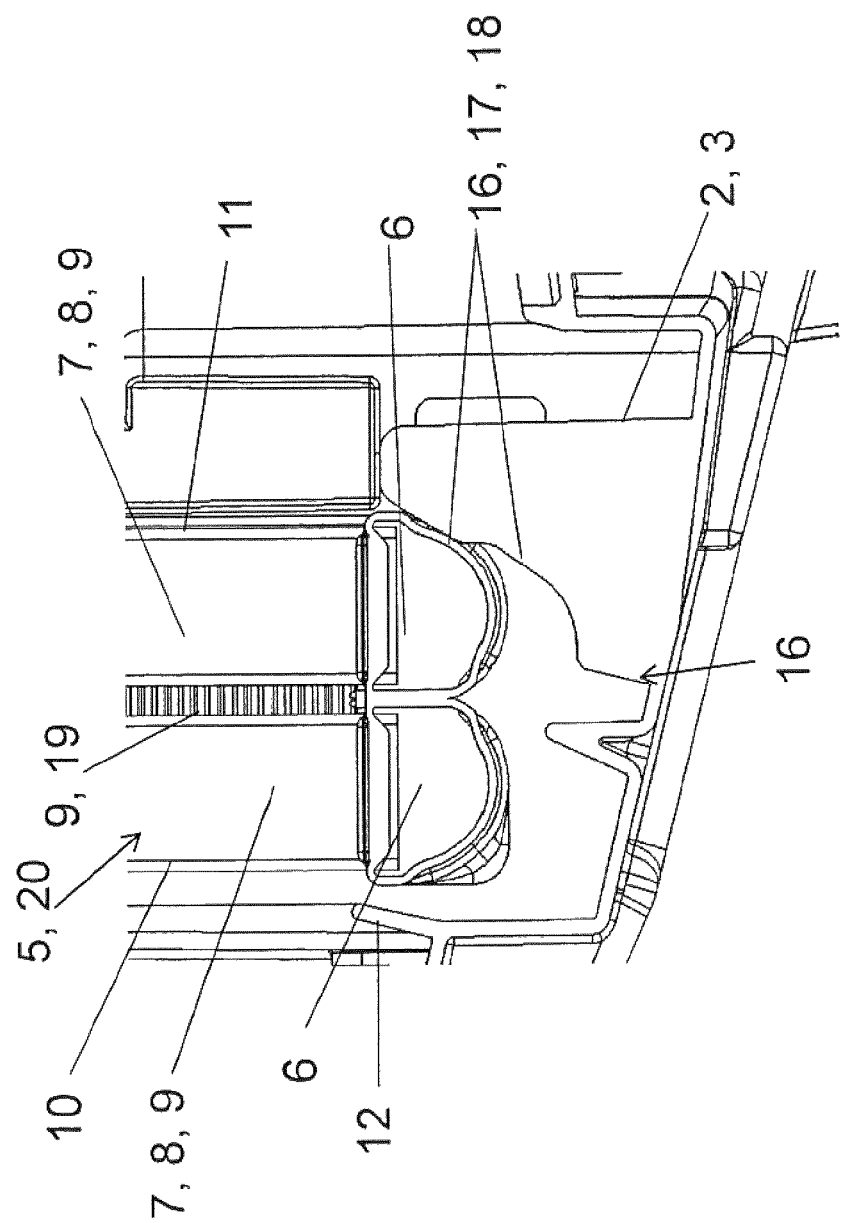
FIG. 3 shows a vertical section of the housing lower part, including the refrigerant evaporator according to FIG. 2, as two manifolds are pushed past an H sealing rib and one manifold is placed on a ramp geometry.
Figure 4:
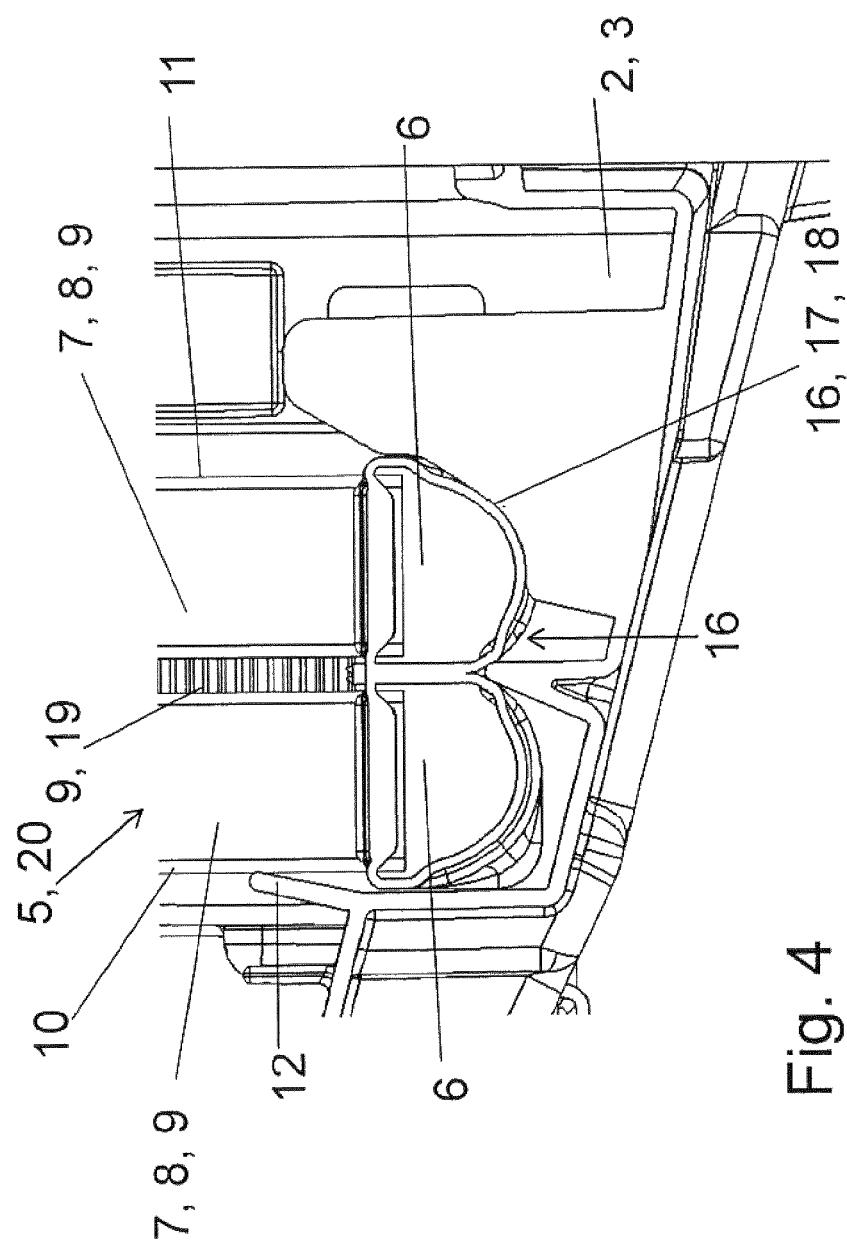
FIG. 4 shows a vertical section of the housing lower part, including the refrigerant evaporator according to FIG. 2, after two manifolds have been placed on housing manifold section having a ramp geometry.

The process of inserting refrigerant evaporator 5 into housing lower part 3 is illustrated in FIGS. 2 through 4. In FIG. 2, the two lower manifolds 6 are pushed past H sealing rib 12. The extension of housing lower part 3 between H sealing rib 12 and right end of right manifold 6 is just sufficient to push manifold 6 through here. When refrigerant evaporator 5 continues to be pushed downward, right manifold 6 (FIG. 3) comes to rest on a ramp geometry 17 or wedge geometry 18 of a housing manifold section 16. Ramp and wedge geometries 17, 18 are formed by housing lower part 3, in particular a housing manifold section 16. Due to the geometry of ramp and wedge geometries 17, 18, refrigerant evaporator 5 is moved to the left in the direction of H ribs 12 when refrigerant evaporator 5 continues to move downward. A movement of this type is possible because, according to the illustration in FIG. 4, larger manifolds 6 have already moved past H sealing rib 12, so that H sealing rib 12 comes to rest on front side 10 of tube block 9 in the lower position when refrigerant evaporator 5 moves. During this movement of refrigerant evaporator 5 in the direction of horizontally oriented H sealing rib 12, vertically oriented V ribs 13 also come to rest laterally on front side 10. Housing manifold section 16 has a geometry which essentially matches the geometry of the outside of the two manifolds 6, so that refrigerant evaporator 5 may be fastened in a form-locked manner to the two lower manifolds 6 with the aid of housing manifold section 16.

Figure 5:
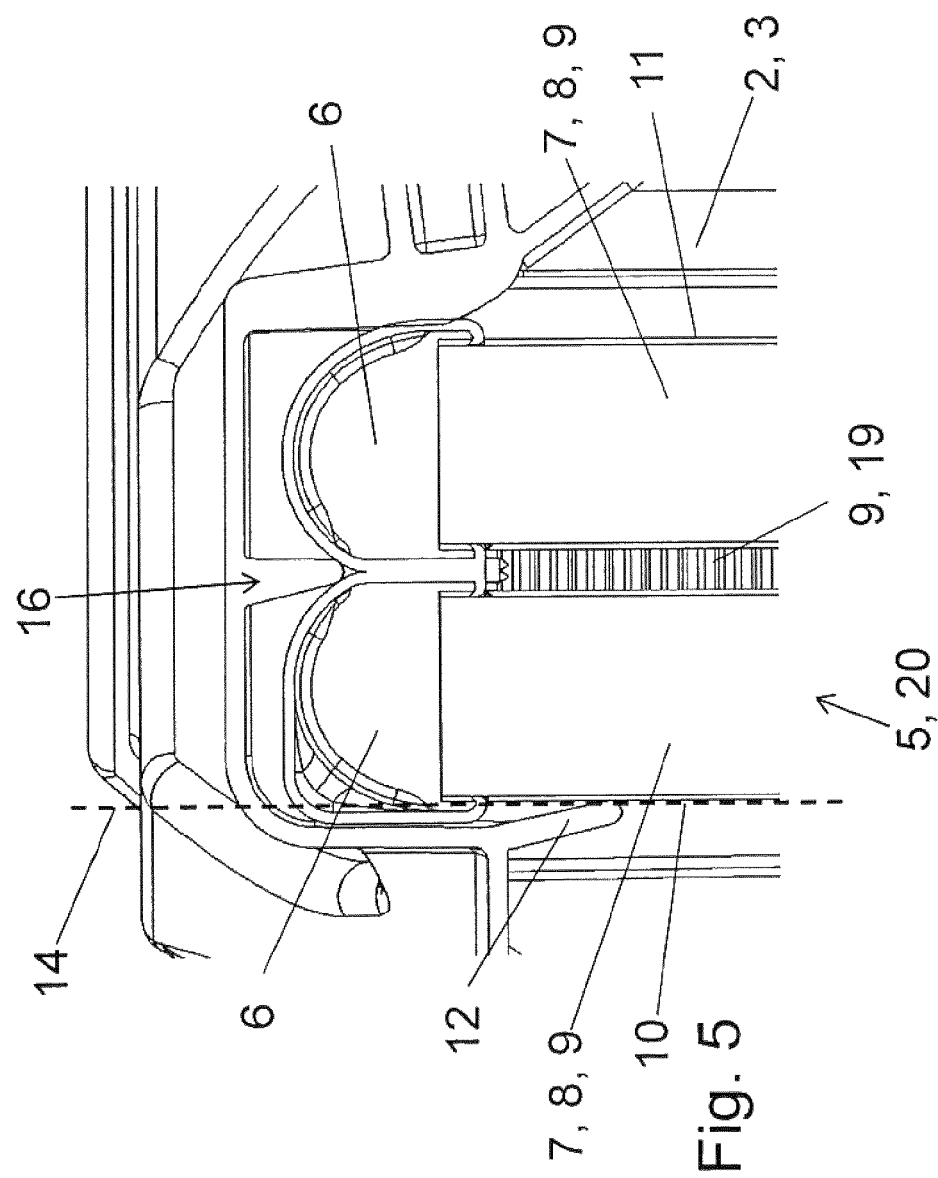
FIG. 5 shows a vertical section of a housing lower part, including the refrigerant evaporator, after two manifolds have been pushed past the H sealing rib.

Housing upper part 4 is illustrated in FIG. 5. When refrigerant evaporator 5 is inserted into housing upper part 4, which is carried out so that housing upper part 4 is pushed onto refrigerant evaporator 5, a process takes place which is similar to inserting refrigerant evaporator 5 into housing lower part 3. Refrigerant evaporator 5 must first be inserted into housing upper part 4 at a slight angle so that the two slightly larger upper manifolds 6 may be pushed past H sealing rib 12. Refrigerant evaporator 5 is then moved in the direction of H sealing rib 12 and the two V sealing ribs 13 so that H sealing ribs 12 and the two lateral V sealing ribs 13 come to rest on the top or on the side of front side 10 of cooling tube block 9. Refrigerant evaporator 5 is also held in a form-locked manner on the two manifolds 6 with the aid of housing manifold section 16 as part of housing 2.

Housing lower part 3 has a condensate drain 15, at which the lower half of the sealing frame, formed by H sealing rip 12 and the two halves of V sealing ribs 13, is slightly interrupted. Condensate forming on refrigerant evaporator 5 may be discharged with the aid of condensate drain 15. The opening in condensate drain 15 is very small so that only a very small, negligible amount of bypass air is produced thereby, due to condensate drain 15.

In another exemplary embodiment, which is not illustrated, housing manifold section 16, in particular ramp or wedge geometry 17, 18, has predetermined breaking points. In motor vehicle air conditioning units 1, it may be necessary for different refrigerant evaporators 5 having different cooling tube blocks 9 having different extensions perpendicular to imaginary plane 14 to be fastened in motor vehicle air condition unit 1. When fastening a tube block 9 having a greater extension perpendicular to imaginary plane 14, only the predetermined breaking points need to be separated, and refrigerant evaporator 5 may be fastened to housing 2 with tube block 9 having a greater depth, e.g., using a provided offset ramp or wedge geometry 17, 18.

Figure 8:
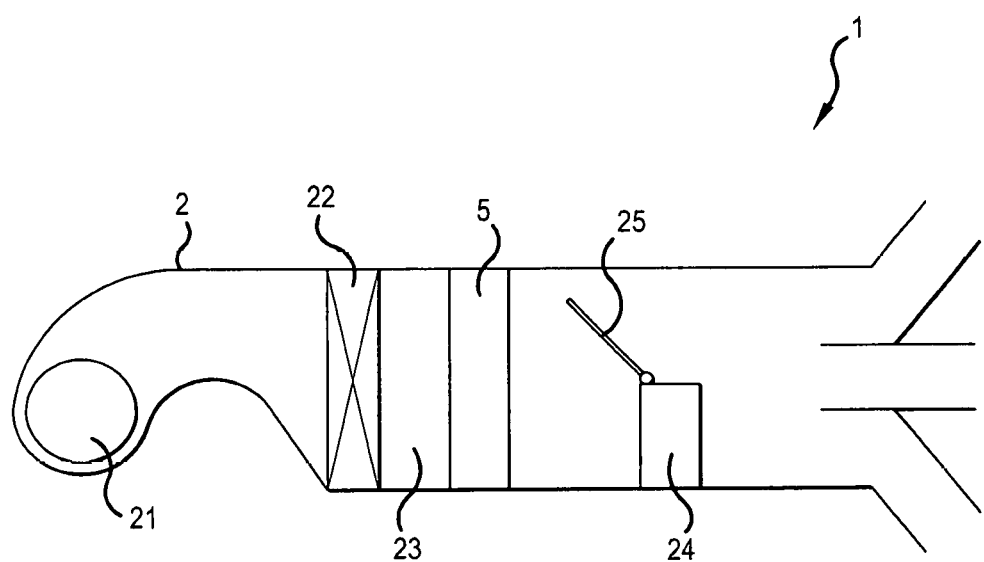
FIG. 8 shows a section of an air conditioning unit.

In yet another exemplary embodiment, as shown in FIG. 8, a motor vehicle air conditioning unit 1 includes a heater 24 for heating the air conducted through the motor vehicle air conditioning unit 1, a blower 21, an air filter 22, an air duct 23 that is delimited by the housing 2 and at least one air conducting device or a damper 25 or corrugated ribs arranged between the tubes.

On the whole, substantial advantages are associated with motor vehicle air conditioning unit 1 according to the invention. The two H sealing ribs 12 and the two V sealing ribs 13 form a sealing ring which essentially completely surrounds front side 10 of tube block 9 so that bypass air flowing around refrigerant evaporator 5 essentially does not occur on refrigerant evaporator 5. H and V sealing ribs 12, 13 may be easily manufactured during injection molding of housing lower part 3 and housing upper part 4, so that no complex side parts need to be fastened in the side area of tube block 9, as is the case according to the prior art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A motor vehicle air conditioning unit comprising:
  a housing;
  a heat exchanger that has two manifolds and tubes that extend between the two manifolds, the tubes being parallel to each other and arranged side by side forming a tube block, the two manifolds projecting beyond a front side and a rear side of the tube block, the front side and the rear side being opposite one another;
  wherein the housing has at least two first sealing ribs extending along the two manifolds in a direction that is perpendicular to the longitudinal axis of the tubes, such that a first one of the at least two first sealing ribs extends along a first one of the two manifolds and a second one of the at least two first sealing ribs extends along a second one of the two manifolds for sealing the front side and/or the rear side of the tube block, and wherein the housing has at least two second sealing ribs extending along the tube block in a direction that is parallel to the longitudinal axis of the tubes for sealing the front side and/or the rear side of the tube block, such that the at least two first sealing ribs extend perpendicular to the at least two second sealing ribs and the at least two first sealing ribs and the at least two second sealing ribs form a rectangular sealing frame around the front side and/or the rear side of the tube block.

2. The motor vehicle air conditioning unit according to claim 1, wherein the at least two first sealing ribs rest on the front side of the tube block and wherein the at least two second sealing ribs rest on the front side of the tube block.

3. The motor vehicle air conditioning unit according to claim 1, wherein the at least two first sealing ribs are oriented at an acute angle towards the front side of the tube block and/or the rear side of the tube block.

4. The motor vehicle air conditioning unit according to claim 1, wherein the at least two first sealing ribs, the at least two second sealing ribs and at least one housing manifold section form a single piece with the housing or a housing part, wherein the at least one housing manifold section has at least one predetermined breaking point, wherein the housing has a two-part design including a housing upper part and a housing lower part, wherein a portion of an inner contour of the at least one housing manifold section matches a portion of an outer contour of the at least two manifolds, and the at least one housing manifold section rests on the at least two manifolds, and wherein another portion of the inner contour of the at least one housing manifold section has a ramp or wedge that is adapted for moving the heat exchanger in a direction of the at least two first sealing ribs and the at least two second sealing ribs when the heat exchanger is inserted into the housing or into the housing part.

5. The motor vehicle air conditioning unit according to claim 1, further comprising:

a heater for heating any air conducted through the motor vehicle air conditioning unit;

a blower;

an air filter;

an air duct which is delimited by the housing; and at least one air conducting device or a damper or corrugated ribs arranged between the tubes.

6. The motor vehicle air conditioning unit according to claim 1, wherein the heat exchanger is a refrigerant evaporator.

7. The motor vehicle air conditioning unit according to claim 1, wherein an end of one of the at least two first sealing ribs contacts an end of one of the at least two second sealing ribs.

8. The motor vehicle air conditioning unit according to claim 1, wherein the first one of the two manifolds is positioned on a top side of the tube block and the second one of the two manifolds is positioned on a bottom side of the tube block, wherein a front side of each of the two manifolds corresponds to the front side of the tube block and a rear side of each of the two manifolds corresponds to the rear side of the tube block, wherein a bottom side of each of the two manifolds faces openings of the tubes of the tube block and a top side of each of the two manifolds opposes the bottom side thereof, respectively.

9. The motor vehicle air conditioning unit according to claim 1, wherein a portion of each of the at least two first sealing ribs directly rests on the front side and/or the rear side of the tube block.

\* \* \* \* \*